US012667984B2

(12) United States Patent
Pedercini

(10) Patent No.: US 12,667,984 B2
(45) Date of Patent: Jun. 30, 2026

(54) MECHANICAL POSITIONING DEVICE, SYSTEM PROVIDED WITH SAID DEVICE AND POSITIONING PROCESS

(71) Applicant: TECSI S.R.L., Rovato (IT)

(72) Inventor: Severino Pedercini, Cologne (IT)

(73) Assignee: TECSI S.R.L., Rovato (IT)

( * ) Notice: Subject to any disclaimer, the term of this patent is extended or adjusted under 35 U.S.C. 154(b) by 0 days.

(21) Appl. No.: 18/860,068

(22) PCT Filed: Apr. 26, 2023

(86) PCT No.: PCT/IB2023/054286
§ 371 (c)(1),
(2) Date: Oct. 25, 2024

(87) PCT Pub. No.: WO2023/209584
PCT Pub. Date: Nov. 2, 2023

(65) Prior Publication Data
US 2025/0290562 A1 Sep. 18, 2025

(30) Foreign Application Priority Data
Apr. 27, 2022 (IT) ........................ 102022000008366

(51) Int. Cl.
$B25J\ 19/00$ (2006.01)
$B25J\ 9/10$ (2006.01)
$B25J\ 17/02$ (2006.01)
$F16H\ 55/17$ (2006.01)

(52) U.S. Cl.
CPC .......... *B25J 19/0004* (2013.01); *B25J 9/102* (2013.01); *B25J 17/0241* (2013.01); *F16H 2055/173* (2013.01)

(58) Field of Classification Search
CPC .... B25J 9/102; B25J 17/0241; B25J 19/0004; F16H 1/32; F16H 1/36; F16H 1/46; F16H 2001/324; F16H 2055/173
See application file for complete search history.

(56) References Cited

U.S. PATENT DOCUMENTS

| | | | |
|---|---|---|---|
| 4,015,487 A | 4/1977 | Pfister | |
| 10,968,969 B2 * | 4/2021 | Atmur | .................... B60T 1/065 |
| 2017/0305533 A1 * | 10/2017 | Viennot | ................... F16H 1/46 |

FOREIGN PATENT DOCUMENTS

| | | |
|---|---|---|
| EP | 1386693 A1 | 2/2004 |
| IT | 9022421 A1 | 6/1992 |

OTHER PUBLICATIONS

International Search Report and Written Opinion dated Aug. 4, 2023 in corresponding International Application No. PCT/IB2023/054286, 7 pages.

* cited by examiner

*Primary Examiner* — Joseph Brown
(74) *Attorney, Agent, or Firm* — MH2 Technology Law Group LLP

(57) ABSTRACT
A mechanical positioning device for positioning a component includes a first crown integral to the component and rotating around a rotation axis. The first crown includes a first toothing having N1 teeth. A fixed second crown includes a second toothing having N2 teeth, and a third crown is interposed between the first and second crowns and rotates around the rotation axis. The third crown includes a primary coupling toothing having N1 teeth and a secondary coupling toothing having N2 teeth. At least one satellite gear engages the first and second toothings. N1 is different from N2. The device is configurable between a closed configuration wherein the three crowns are integral with each other, and an open configuration wherein the three crowns are spaced from each other.

12 Claims, 9 Drawing Sheets

MECHANICAL POSITIONING DEVICE, SYSTEM PROVIDED WITH SAID DEVICE AND POSITIONING PROCESS

CROSS-REFERENCE TO RELATED APPLICATIONS

This application is a U.S. National Stage application of PCT/IB2023/054286, filed Apr. 26, 2023, pending, which claims priority to Italian Patent Application No. 102022000008366, filed Apr. 27, 2022, the disclosures of which are hereby incorporated by reference in their entireties.

FIELD OF THE INVENTION

The present invention has as object a mechanical positioning device. Specifically, the object of the present invention is a mechanical positioning device particularly suitable for the precise positioning of an instrument or apparatus connected to it, for example a tool. The mechanical positioning device according to the present invention finds particular application in systems wherein is particularly critical the positioning, in particular the inclination, of the working instrument or apparatus connected to the device itself.

The present invention has also as object a system comprising said mechanical positioning device, as well as the relative positioning process involving the actuation of the mechanical positioning device.

STATE OF THE ART

In various branches of industry, actuations are known for the precise control of the position of other entities connected to and controlled by these actuations. Depending on the type of the load to be moved and/or other structural constraints, such as cost and space above all, a particular type of actuation is preferred to the others on the market.

In particular, it is known the use of manipulators suitable for modifying the position and/or orientation of tools used for the execution of automated processings in the field of industry or of the components within a system/apparatus.

Generally, the above-mentioned manipulators are actuated by means of electric motors, which move the associated tools by means of transmission organs, typically comprising gears, belts or chains connecting the shafts of the moved elements.

When the positioning precision is particularly critical in the operations to be performed, the choice of the type of actuation is typically reduced or even compulsory.

In the field of printing or watchmaking, where an accurate positioning of the components of the system is essential for an acceptable quality of the final product, stepper motors are typically used. Such motors are particularly popular for their low cost and small size. These properties allow stepper motors to be housed inside printers or watch cases while keeping a small overall bulk at a low production cost.

However, stepper motors are typically capable of delivering low power and this makes them unsuitable for handling and positioning loads whose weight is not negligible.

Furthermore, while the accuracy of stepper motors in positioning the related components is acceptable in some applications, for other applications where the precision is particularly critical, this accuracy is not sufficient. This problem is largely due to the poor control in the transients of the power supply, which makes it difficult to control the position in the initial and ending phases of the movement of the controlled component.

In order to overcome the drawbacks discussed above, other types of motors are used, such as, for example, asynchronous motors with vector control, which, however, are particularly expensive and often oversized for the real needs of the field in which they are used.

Furthermore, all known solutions have problems with respect to the maintenance of the reached position, which can be accidentally modified if the modified component is subjected to forces sufficient to overcome the resistance to the motion opposed by the component and the connected actuation.

Thus, the actuation precision in the positioning of the component or of the connected tool is a function of the technology with which the motor driving the entire actuation is designed. Typically, the greater the required precision, the higher the costs of the production and construction complexity of the entire system. In addition to this, the spatial and timing constraints of the response often do not allow for the availability of actuations that correspond to all the design requirements and, therefore, one falls back on compromise solutions that are sub-optimal in their nature.

Thus, although the known actuations described above allow for accurate positioning of the connected components, the Applicant has found that these known solutions could be further improved, for example in terms of the positioning precision, maintenance of the reached position, cost of the production/installation and constructive simplicity.

PURPOSE OF THE INVENTION

A general aim of the present invention is therefore to solve at least one of the drawbacks and/or limitations of the previous solutions.

An aim of the invention is to make available a mechanical positioning device which is particularly precise in the positioning of the component connected thereto and allows to choose between a large number of possible positionings so as to guarantee an externally fine adjustment of the position.

A further aim of the present invention is to provide a mechanical positioning device which is structurally simple and particularly solid to ensure reliable maintenance of the position reached in the positioning operations.

A further aim of the present invention is to provide a mechanical positioning device which is particularly economical and durable.

Furthermore another aim of the present invention is to provide a system comprising said mechanical positioning device and the related component connected thereto, as well as a motor for the movement of the mechanical positioning device itself.

Another aim of the present invention is also to show a positioning process of a component using said mechanical positioning device.

One or more of the aims indicated above are substantially reached by the mechanical positioning device, by the system provided with said mechanical positioning device and by the positioning process according with one or more of the attached claims and/or the following aspects.

SUMMARY

According to a first aspect the present invention refers to a mechanical positioning device of a component.

According to the applications, said component can be a precision tool for carrying out, for example, a processing/manipulation or a sensor, for example an optical sensor having high precision.

According to an aspect, the mechanical positioning device comprises a first toothed crown. Said first toothed crown results, during use, integrally connected to said component. Specifically, the first crown is configured for rotating around a rotation axis so as to bring into rotation said component to position.

According to another aspect, said first crown has a substantially annular form, preferably defined by a solid generated by the complete rotation of a quadrilateral, preferably a rectangle, around said rotation axis, with the latter representing none of the sides of said quadrilateral. According to this aspect, the first crown has:

a first external face;
a first internal face;
a first upper face;
a first lower face.

In other words, said faces represent the faces obtained by the complete rotation around the rotation axis of each of the sides of said quadrilateral whose rotation determines the geometry of the first crown.

According to another aspect, the first crown comprises a first toothing at said first internal face or at said first external face. The first crown has then a series of teeth emerging from the first internal face or from the first external face along the entire circumferential development.

According to another aspect, the first crown comprises a lower toothing at said first lower face. The first crown has then a series of teeth emerging from the first lower face along its entire circumferential development and on at least part of its radial development.

According to an aspect, said first toothing has a number of teeth equal to N1. The number N1 is an integer equal to the number of the peaks and valleys present in said first toothing.

According to another aspect, the mechanical positioning device comprises a second toothed crown. Said second toothed crown results, during use, fixed in rotation with respect to said rotation axis. The first crown results then movable in a rotational direction relatively to the second crown, which is fixed in a rotational direction.

According to another aspect, said second crown has a substantially annular form, preferably defined by a solid generated by the complete rotation of a quadrilateral, preferably a rectangle, around said rotation axis, with the latter representing none of the sides of said quadrilateral. According to this aspect, the second crown has:

a second external face;
a second internal face;
a second upper face;
a second lower face.

In other words, said faces represent the faces obtained by the complete rotation around the rotation axis of each of the sides of said quadrilateral whose rotation determines the geometry of the second crown.

According to another aspect, the second crown comprises a second toothing at said second internal face or at said second external face. The second crown has then a series of the teeth emerging from the second internal face or the second external face along the entire circumferential development.

According to another aspect, the second crown comprises an upper toothing at said second upper face. The second crown has a series of teeth emerging from the second upper face along its entire circumferential development and on at least part of its radial development.

According to an aspect, said second toothing has a number of teeth equal to N2. The number N2 is an integer equal to the number of the peaks and valleys present in said second toothing.

It is noted that in the present document the terms "upper", "upperly", "up", "upwards" and analogously the terms "lower", "lowerly", "under", "downwards" are to be intended as referring to a direction parallel to the rotation axis and to a direction that goes from the second crown to the first crown.

In a similar way, the terms "internal", "internally", "internal", "inwards" and analogously the terms "external", "externally", "external", "outwards" are to be intended as referring to a direction lying on a plane perpendicular to the rotation axis and to a direction of the moving away from said rotation axis.

According to another aspect, the mechanical positioning device comprises a third toothed crown. Said third toothed crown results, during use, configured for rotating around said rotation axis. As it will become clearer later, the third crown is configured for rotating relatively with respect to the first crown and to the second crown.

According to another aspect, said third crown has a substantially annular form, preferably defined by a solid generated by the complete rotation of a quadrilateral, preferably a rectangle, around said rotation axis, with the latter representing none of the sides of said quadrilateral. According to this aspect, the third crown has:

a third external face;
a third internal face;
a third upper face;
a third lower face.

In other words, said faces represent the faces obtained by the complete rotation around the rotation axis of each of the sides of said quadrilateral whose rotation determines the geometry of the third crown. In particular, the third upper face results facing to the first lower face of the first crown and the third lower face results facing to the second upper face of the second crown.

According to another aspect, the third crown comprises a third toothing at said third external face or at said third internal face. The third crown has a series of the teeth emerging from the third external face or from the third internal face along its entire circumferential development.

According to another aspect, the third crown comprises a primary coupling toothing at said third upper face and secondary coupling toothing at said third lower face. The third crown has a series of the teeth emerging from said third upper face and third lower face along their entire circumferential development and on at least part of their radial development.

According to an aspect, said primary coupling toothing has a number of teeth equal to a number of teeth of said lower toothing of the first crown. According with this aspect, said primary coupling toothing and said lower toothing have equal profile for allowing a coupling between the third crown and the first crown, as it will become clearer in the following.

According to another aspect, said secondary coupling toothing has a number of teeth equal to a number of teeth of said upper toothing of the second crown. According with this aspect, said secondary coupling toothing and said upper toothing have equal profile for allowing a coupling between the third crown and the second crown, as it will become clearer in the following.

According to another aspect, said mechanical positioning device comprises at least one satellite gear. Said at least one satellite gear results associated with said third crown and is brought into rotation around said rotation axis from the third crown itself. In other words, the at least one satellite gear is connected and supported by said third crown, which brings it into rotation when it rotates around the rotation axis.

According to another aspect, said at least one satellite gear is engaged simultaneously to said first crown and to said second crown. According with this aspect, the at least one satellite gear comprises two toothing placed at the opposite sides of the third crown along the rotation axis, of which one is coupled to the first toothing and the other is coupled to the second toothing.

According to another aspect, said number of teeth N1 and number of teeth N2 are different from each other. As it will become clearer later, the difference between the numbers of teeth of the toothing determines a rotation of the first crown such as to ensure an extremely precise positioning of the working component constrained to the first crown itself.

According to yet another aspect, the mechanical positioning device results configurable between the following configurations:

closed configuration or working configuration, wherein said lower toothing and said primary coupling toothing are engaged with each other, said secondary coupling toothing and said second toothing upper are engaged with each other too, and wherein said first crown, second crown and third crown are integral with each other;

open configuration or positioning configuration, wherein said first crown, second crown and third crown are spaced from each other and said lower toothing, primary coupling toothing, secondary coupling toothing, said upper toothing are not engaged to each other.

It is noted in particular that in the closed position or working configuration no relative movement is possible between said first, second and third crown. In other words, the mechanical positioning device constitutes in fact a single block wherein the three crowns remain integrally constrained. Specifically, being the second crown fixed, also the first crown and the third crown are fixed. Consequently, also the working component, that is constrained to the first crown, results to be fixed. Then, when the mechanical positioning device is in said closed configuration or working configuration, it is not possible to vary the position of the component connected to the mechanical positioning device.

On the contrary, when the mechanical positioning device is in the open configuration or positioning configuration, is possible a relative movement between said first, second and third crown. In particular, the rotation of the first crown involves a variation of the position of the component. Bringing back the mechanical positioning device in the closed configuration, the position taken in the open configuration can be maintained without the action of further blocking means.

As previously introduced, the number of teeth N1 and the number of teeth N2 are different from each other. Specifically, N1 and N2 represent two integers that differ between them for a determined number of units. Generally, between the number N1 and the number N2 there is a relation of the type $N1=N2\pm K$, with K being an integer greater than 0.

In an embodiment, the number of teeth N1 and the number of teeth N2 differ of a unit ($K=1$), i.e. $N1=N2\pm1$.

In another embodiment, the number of teeth N1 and the number of teeth N2 differ of the two or more units ($K>1$), i.e. $N1=N2\pm n$, where n is an integer greater than 1.

According to a non-limiting aspect, said lower toothing of the first crown has a number of teeth equal to N1, i.e. the same number of teeth of the first toothing. Consequently, also the primary coupling toothing has a number of teeth equal to N1 too, in order to allow the engagement with the lower toothing.

According to another non-limiting aspect, said upper toothing of the second crown has a number of teeth equal to N2, i.e. the same number of teeth of the second toothing. Consequently, also the secondary coupling toothing has a number of teeth equal to N2 too, in order to allowing the engagement with the upper toothing.

According to another non-limiting aspect, said third toothing of the third crown has a number of teeth equal to N2, i.e. the same number of teeth of the second toothing of the second crown.

According to an embodiment, said first toothing is placed at said first internal face and at said second toothing is placed at said second internal face. In other words, the toothing engaged by said at least one satellite gear are on the internal faces of the first crown and of the second crown, i.e. the portions facing towards the rotation axis. On the contrary, said third toothing is placed at said third external face, i.e. facing outwards for being engaged by further toothed elements as it will be described hereinafter.

According to another embodiment, said first toothing is placed at said first external face and at said second toothing is placed at said second external face. In other words, the toothing engaged by said at least one satellite gear are on the external faces of the first crown and of the second crown, i.e. the portions facing outwards. On the contrary, said third toothing is placed at said third internal face, i.e. facing towards said rotation axis for being engaged by further toothed elements as it will be described hereinafter.

It is noted that it is appropriate that said first toothing and second toothing are both on the internal faces or both on the external faces of the respective crowns so as to be simultaneously engaged by the satellite gears. The third toothing is preferably facing in the opposite direction to said first toothing and second toothing. However, with appropriate measures, it can be facing in the same direction of the first toothing and of the second toothing.

According to a non-limiting aspect, said at least one satellite gear comprises a shaft, a first pinion and a second pinion. Said shaft develops along a longitudinal extension axis and crosses said third crown from said third lower face to said third upper face, resulting projecting from them. In particular, said longitudinal extension axis results parallel to the rotation axis of the first crown and third crown.

According to a non-limiting aspect, the third crown comprises a seat for said at least one satellite gear so as to allow the housing of said shaft. Said shaft is configured for rotating with respect to said third crown around said longitudinal extension axis. According with this aspect, said shaft is free to rotate around its own longitudinal extension axis to the internal of the relative seat in the third crown, which is preferably provided with appropriate bearings.

According with another non-limiting aspect, at least one between said first pinion and second pinion results fitted on said shaft integrally to it. According with yet another non-limiting aspect, at least one between said first pinion and second pinion is realized in a single piece with said shaft.

According to what has been introduced above, the assembly composed by said shaft, first pinion and second pinion—coincident, in fact, with the satellite gear—is configured for rotating integrally around said longitudinal extension axis of the shaft. In particular, the satellite gear is configured for rotating around said longitudinal extension axis while it is brought into rotation around said rotation axis by the third crown.

According to another non-limiting aspect, said first pinion and second pinion are provided with relative toothing. Specifically, the first pinion is provided with a first satellite toothing and the second pinion is provided with a second satellite toothing. According with this aspect, the first satellite toothing results engaged to the first toothing of the first crown and the second satellite toothing results engaged to the second toothing of the second crown.

According to another non-limiting aspect, said first satellite toothing and said second satellite toothing have an equal number of teeth N3. Preferably, said first satellite toothing and said second satellite toothing have the same pitch diameter. In fact, said first satellite toothing and second satellite toothing are two identical toothing and consequently said first pinion and second pinion are structurally identical.

According with another non-limiting aspect, said first toothing and said second toothing have equal pitch diameter. In fact, the first crown and the second crown have the first toothing and the second toothing on respective internal or external faces, according to the embodiment, having substantially equal diameter.

According with a non-limiting aspect, the first toothing and the second toothing have each one teeth with involute profile with modulus correction in order to be engaged, respectively, to said first satellite toothing and to said second satellite toothing. In fact, given the discrepancy between the numbers of the teeth N1 and N2 and the equality between the pitch diameters, without applying a modulus correction technique to the first toothing and/or to the second toothing it would be impossible to simultaneously engage the first satellite toothing and the second satellite toothing, which is recalled being coincident. In this sense, the use of the modulus correction technique allows the at least one satellite gear to simultaneously correctly engage both the first toothing and the second toothing without substantial structural differences between the first satellite toothing and the second satellite toothing.

In an alternative embodiment, said first satellite toothing and second satellite toothing are different from each other in the number of teeth and/or in the profile of teeth and/or in the respective pitch diameters for allowing a correct engagement both with the first toothing and with the second toothing, without the latter necessarily having to have the same pitch diameter and/or a modulus correction technique should be applied to ensure the correct engagement between the teeth of said first toothing and second toothing with the relative first satellite toothing and second satellite toothing.

According to a non-limiting aspect, said mechanical positioning device comprises a plurality of the satellite gears, i.e. at least two satellite gears. Specifically, each of said satellite gears forms with another satellite gear adjacent thereto a determined angle with respect to the rotation axis, i.e. said satellite gears occupy different positions along the circumferential development of the third crown.

According to another non-limiting aspect, at least one satellite gear has the first satellite toothing rotated around said longitudinal extension axis by an angle with respect to the second satellite toothing. In fact, being the number of teeth N1 and N2 different, the first toothing and the second toothing have the most of their teeth non-aligned along the rotation axis. Specifically, according to the relative positioning thereto, the first toothing and the second toothing can have a limited number of pairs of the aligned teeth, precisely have at most a number of the aligned pairs equal to absolute value of the difference N1–N2. If the number of the satellite gears was greater than this number and first satellite toothing and second satellite toothing were completely aligned, a correct engagement would not be possible with the teeth of the first toothing and/or of the second toothing. In this sense, in order to ensure a correct engagement of all the satellite gears with the first toothing and the second toothing, at least one of the satellite gears has the first satellite toothing rotated with respect to the second satellite toothing around the longitudinal extension axis.

According to another non-limiting aspect, the lower toothing and the primary coupling toothing are Hirth toothing configured for establishing a Hirth coupling between said first crown and third crown when said device is in the closed configuration.

According with another non-limiting aspect, the upper toothing and the secondary coupling toothing are Hirth toothing configured for establishing a Hirth coupling between said second crown and said third crown when said device is in the closed configuration.

It is noted that toothing functionally equivalent to the Hirth toothing can be used in the context of the mechanical positioning device according to the present invention. The use of the Hirth toothing advantageously ensures a particularly stable engagement between the crowns when the mechanical positioning device is in the closed position and consequently a particular steadiness of the component positioned by the device itself.

According with another non-limiting aspect, the mechanical positioning device comprises at least an opening actuator. This at least an opening actuator results configured for causing a passage of said device from the closed configuration to the open configuration. As it will become clearer in the following of the present description, when the mechanical positioning device is not subjected to the action of further elements suitable for keeping it in the closed configuration, the at least an opening actuator ensures a transition from the closed configuration to the open configuration, causing the spacing between said first, second and third crown in order to allow a positioning of the component connected to the first crown after the relative movement between said crowns and the satellite gears.

Specifically, said at least an opening actuator is positioned on said third crown and is configured for acting on said first crown and second crown in order to space them from the third crown and allowing the passage of the mechanical positioning device to the open configuration.

According to an embodiment, said at least an opening actuator comprises a spring piston acting on said first crown and/or second crown. Other elements functionally analogous to spring pistons can be used as actuators of the opening in the context of the mechanical positioning device of the present invention.

According to another non-limiting aspect, said third crown has a housing portion comprising at least a seat for said at least one satellite gear. Specifically, said housing portion is configured for not being in contact with said first crown and second crown when said device is in said closed position. In fact, the third crown is oversized with respect to said first crown and second crown and the housing portion has substantially an internal or external flange, according to the embodiments, upon which are obtained the seats for the housing of the satellite gears. As previously said, these seats are preferably provided with bearings for allowing the free rotation of the satellite gears around the main development axis.

According to another aspect, the present invention refers also to a positioning system comprising at least the following elements:

the mechanical positioning device according with one or more of the previous aspects;

a component to be positioned constrained to said first crown;

an actuator module operatively connected to said device and configured for imparting a rotary motion to said third crown.

Said component is constrained to the first crown through appropriate constraining means, known in the art.

In particular, said actuator module is activated when said mechanical positioning device is in the open configuration in order to position the component through a relative rotation between said first, second and third crown. As it will become clearer later, the rotary motion imparted by the actuator module to the third crown transfers, through the satellite gears, to the first crown and then to the component constrained thereto.

According to another non-limiting aspect, the positioning system comprises a tightening module configured for being activated so as to maintain said mechanical positioning device in the closed configuration and for being released for allowing a passage of the device from the closed configuration to the open configuration. Specifically, the tightening module is configured, when activated, for opposing and winning the action of the at least an opening actuator so as to maintain the mechanical positioning device in the closed configuration and ensure the steadiness of the associated component. When said tightening module is released, the action of the at least an opening actuator is no longer opposed and the mechanical positioning device passes to the open configuration for allowing a positioning of the component through a relative rotation between said first, second and third crown. One reached the desired positioning of the component, the tightening module is again activated and the mechanical positioning device returns in the closed configuration.

According to yet another non-limiting aspect, the actuator module comprises a motor and a transmission member operatively connected to the third crown and configured to transmit the motion imparted by said motor to said third crown. Specifically, the motor is configured for being activated only when said mechanical positioning device is in the open configuration. In fact, when said mechanical positioning device is in the closed position, the third crown is integral with the second crown fixed and therefore it is not possible to move it. The activation of the motor when the mechanical positioning device is in closed configuration could expose the entire system to the risk of the malfunction and damages.

According to another non-limiting aspect, the transmission member comprises at least a toothed wheel engaged to said third toothing for putting in rotation said third crown around said rotation axis as a function of the motion imparted by said motor.

According to yet another non-limiting aspect, said component to be positioned is a tool head suitable for carrying out a processing and/or a manipulation of an object. Alternatively, said component to be positioned is a sensor, for example a precision optical sensor.

It is also object of the present invention a positioning process of said component.

According to an aspect, said positioning process comprises at least the following steps:

arranging a device according to one or more of the aspects previously introduced;

constraining said component to said first crown;

bringing said device in said open position;

rotating said third crown causing a rotation of the first crown;

bringing said device in said closed position.

Specifically, said step of rotating said third crown provides to rotate also said at least one satellite gear, which engages said first toothing and second toothing with said first satellite toothing and second satellite toothing. By virtue of the difference between the number $N1$ of the teeth of the first toothing and the number $N2$ of the teeth of the second toothing and due to the fact that said second crown is fixed in rotation, the first crown undergoes a rotation around the rotation axis that is function of said difference $N1-N2$ between the teeth of the first toothing and of the second toothing. In fact, when it is moved in the open configuration, the mechanical positioning device behaves as a planetary geared motor with offset teeth wherein the reduction ratio is function of the difference $N1-N2$.

According to a non-limiting aspect, said step of rotating said third crown provides to rotate said third crown of a number $N$ of the teeth. In the embodiments wherein the third toothing has a number of teeth equal to $N2$, this rotation corresponds to a rotation of the third crown by an angle equal to $N \cdot 360°/N2$ around said rotation axis. By virtue of the interaction between satellite gears and said first and second crowns, the rotation of the third crown causes a rotation of the first crown by an angle equal to $N \cdot 360° \cdot (N2-N1)/(N1 \cdot N2)$. In fact, the rotating movement of the first crown is partialized into a multitude of positions equal to a multiple of the number $N1$, at most equal to the product $N1 \cdot N2$. Indeed, when for example when $N1=N2 \pm 1$, at each movement of a tooth of the third crown, the first crown rotates by an angle equal to $360°/(N1 \cdot N2)$. The first crown can take then on $N1 \cdot N2$ different angular positions, a number significantly greater than the $N1$s it could take if it were individually employed.

BRIEF DESCRIPTION OF THE DRAWINGS

Some embodiments and some aspects of the invention will be described hereinafter with reference to the attached figures, provided for illustrative purposes only and therefore not limiting wherein.

DETAILED DESCRIPTION

Figure 1:
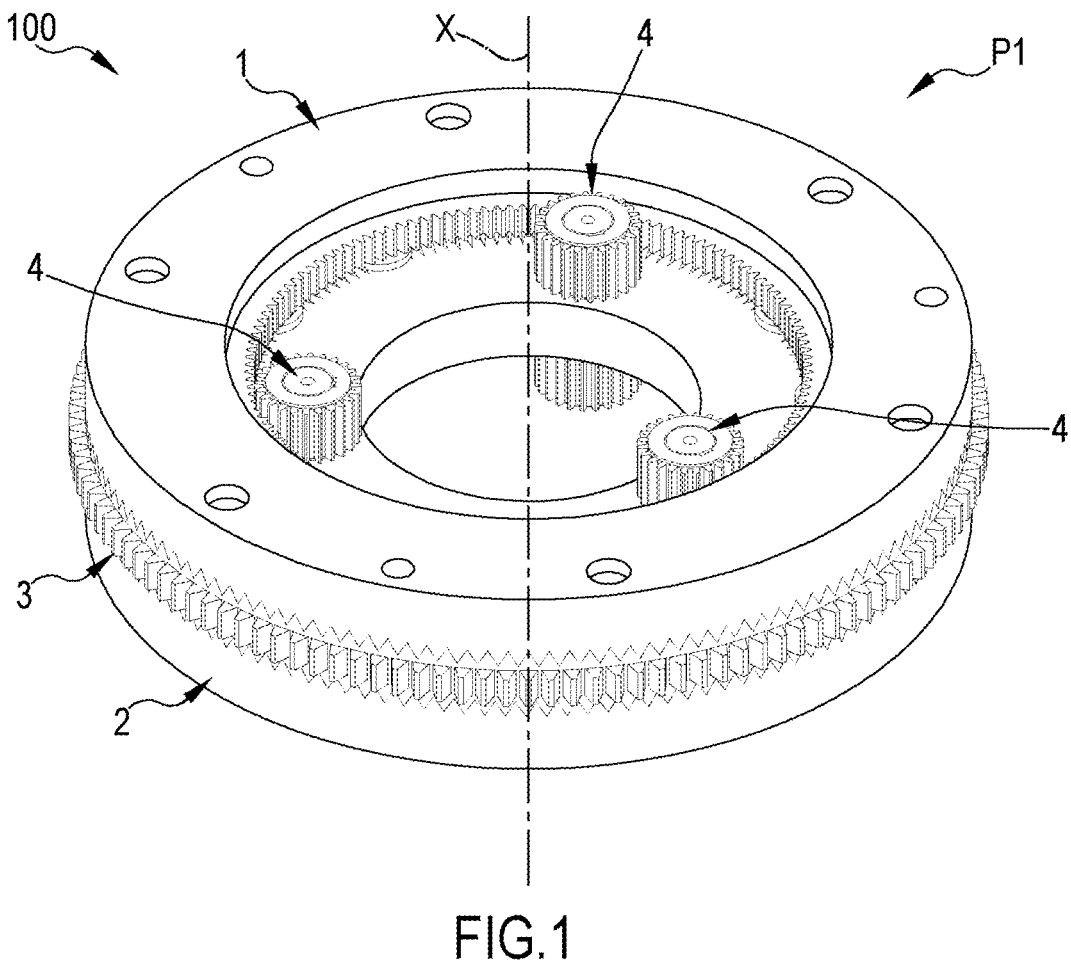
FIG. 1 is a perspective view of the mechanical positioning device according with the present invention according to a first configuration.
Figure 2:
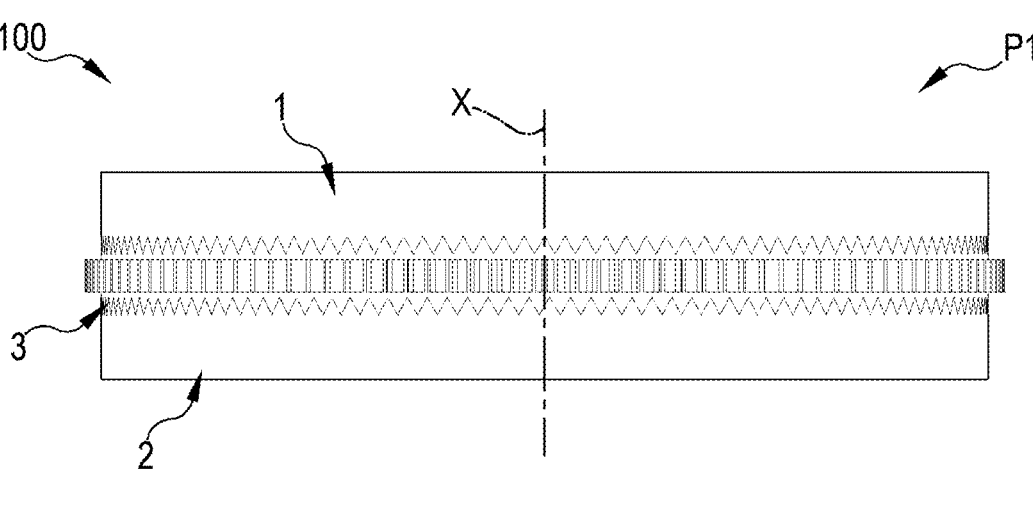
FIG. 2 is a front view in plan of the device shown in FIG. 1.
Figure 3:
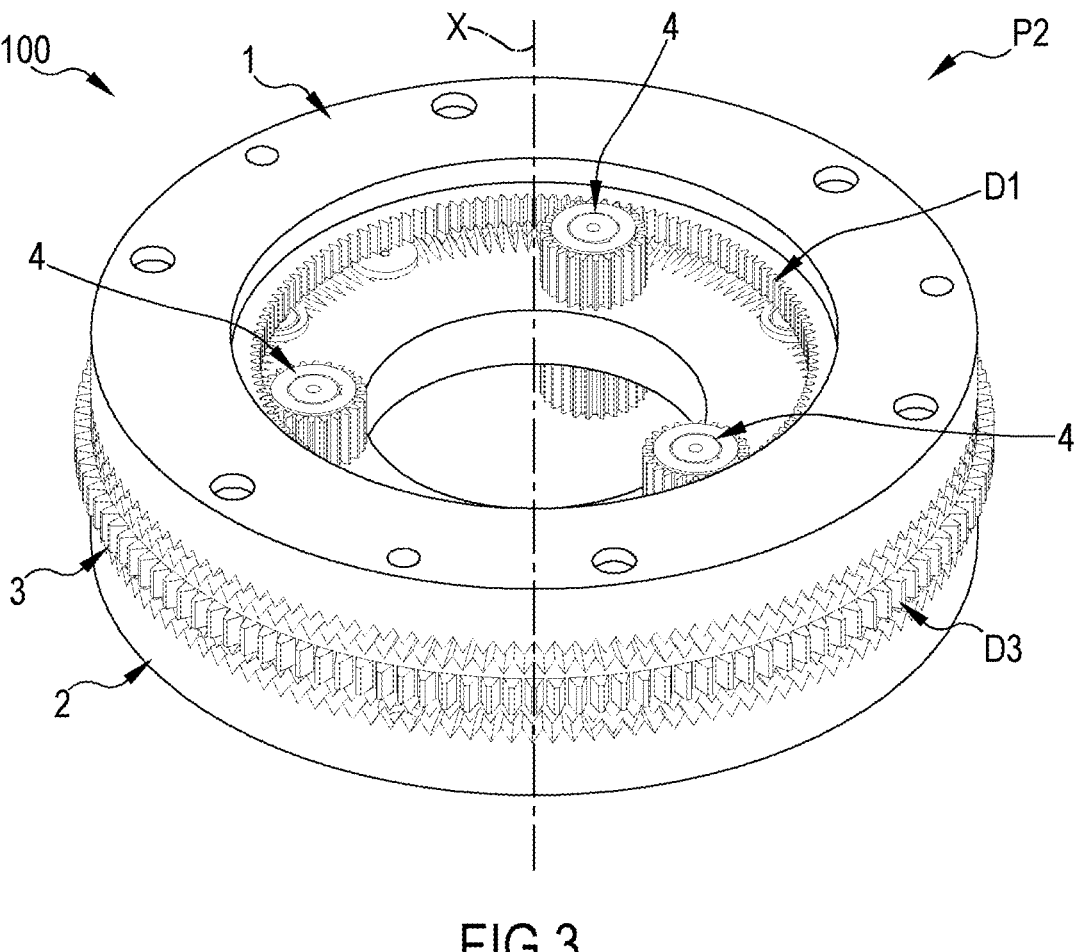
FIG. 3 is a perspective view of the device shown in FIG. 1 according with a second configuration.
Figure 4:
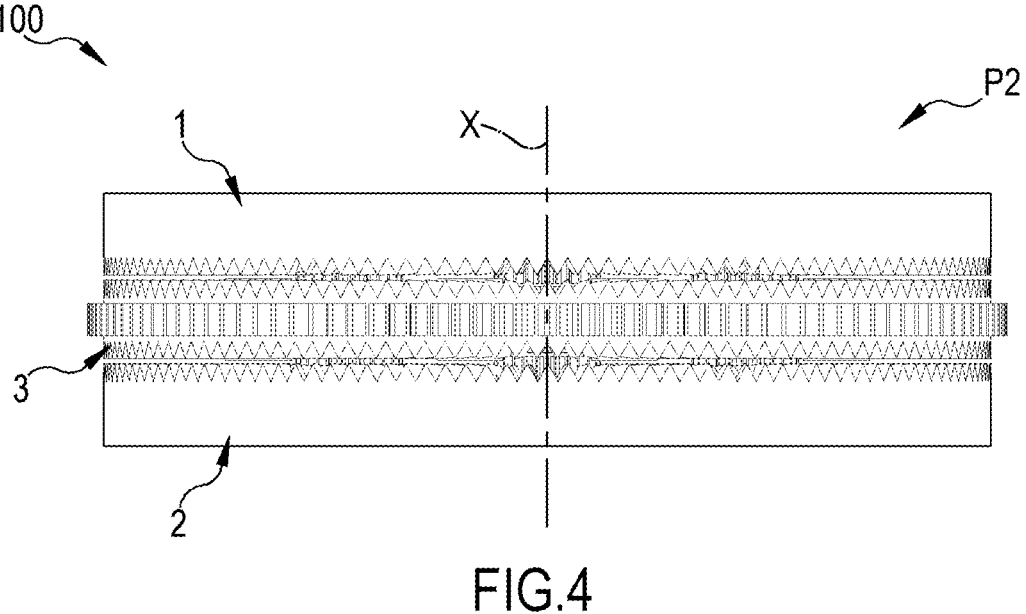
FIG. 4 is a front view in plan of the device shown in FIG. 3.

It is noted that in the present detailed description correspondent parts shown in the various figures are indicated with the same numerical references. Figures could show the object of the invention through unscaled representations; therefore, parts and components shown in figures related to the object of the invention could exclusively relate to schematic representations.

With reference to the attached figures it has been overall represented with the reference 100 a mechanical positioning device, hereinafter indicated for easiness as device 100. Specifically, the present description refers to a device 100 for the positioning of a component 200. According to the applications, said component 200 can comprise a tool for carrying out, for example, a precision processing/handling or a sensor, for example a precision optical sensor.

As shown in FIGS. 1-4, the device 100 comprises three toothed crowns. Specifically, the device 100 comprises:

- a first toothed crown 1;
- a second toothed crown 2;
- a third toothed crown 3 interposed between said first crown 1 and second crown 2.

As represented by the attached figures, said first, second and third crowns have a substantially annular form, preferably defined by a solid generated by the complete rotation of a quadrilateral, specifically a rectangle, around a rotation axis X, with the latter representing none of the sides of said quadrilateral. Said first crown 1, second crown 2 and third crown 3 result aligned along the rotation axis X.

It is noted that in the present document the terms "upper", "upperly", "up", "upwards" and analogously the terms "lower", "lowerly", "under", "downwards" are to be intended as referring to a direction of the alignment of the three crowns 1, 2 and 3, i.e. the rotation axis X, and to a direction that goes from the second crown 2 to the first crown 1. The relative position between the various elements of the device 100 results evident also from the graphical representations of the attached figures that have been designed according with the present description.

In a similar way, the terms "internal", "internally", "internal", "inwards" and analogously the terms "external", "externally", "external", "outwards" are to be intended as referring to a direction lying on a plane perpendicular to the rotation axis X and to a direction of the approaching/moving away from said rotation axis X.

According with what has been previously said, the device 100 comprises a first crown 1. As shown in FIGS. 2-15, the first crown 1 results, during use, integrally connected to said component 200. Specifically, the first crown 1 is configured for rotating around a rotation axis X so as to bring in rotation said component 200. The first crown 1 has:

a first external face 1o facing outwards;
a first internal face 1i facing inwards;
a first upper face 1d facing downwards;
a first lower face 1u facing upwards.

Said faces represent the faces obtained by the complete rotation around the rotation axis X of each of the sides of the quadrilateral the rotation thereof determines the geometry of the first crown 1.

The first crown 1 comprises a first toothing D1 at said first internal face 1i or at said first external face 1o. The first crown 1 has then a series of the teeth emerging from the first internal face 1i or from the first external face 1o along the entire circumferential development. In the shown embodiment, the first toothing D1 is placed on said first internal face.

Said first toothing D1 has a number of teeth equal to N1. The number N1 is an integer equal to the number of the peaks and valleys present in said first toothing D1.

Furthermore, the first crown 1 comprises a lower toothing D1-3 at said first lower face 1d. The first crown 1 has then a series of the teeth emerging from the first lower face 1d along its entire circumferential development and on at least part of its radial development.

Figure 7:
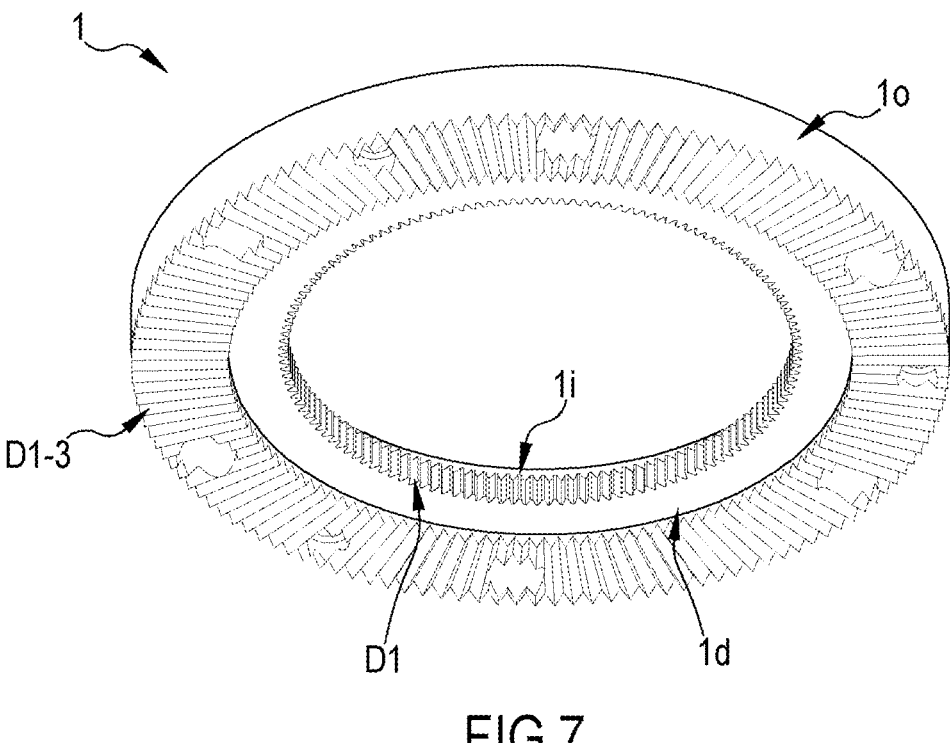
FIG. 7 is a perspective view of a first component of the device shown in FIG. 1.

In the embodiment shown in the attached figures, in particular in FIG. 7, the lower toothing D1-3 has also a number of teeth equal to N1, i.e. the same number of teeth of the first toothing D1.

According with what has been previously determined, the device 100 comprises a second crown 2 toothed. This second crown 2 results, during use, fixed in rotation with respect to said rotation axis X. The first crown 1 results then movable in a rotational direction relatively to the second crown 2, which is fixed in a rotational direction. The second crown 2 has:

a second external face 2o facing outwards;
a second internal face 2i facing inwards;
a second lower face 2d facing downwards;
a second upper face 2u facing upwards.

In other words, said faces represent the faces obtained by the complete rotation around the rotation axis X of each of the sides of the quadrilateral the rotation thereof determines the geometry of the second crown 2.

The second crown 2 comprises a second toothing D2 at said second internal face 2i or at said second external face 2o. The second crown has then a series of the teeth emerging from the second internal face 2i or from the second external face 2o along the entire circumferential development. In the shown embodiment, the second toothing D2 is placed at the second internal face 2i.

Said second toothing D2 has a number of teeth equal to N2. The number N2 is an integer equal to the number of the peaks and valleys present in said second toothing D2.

The second crown 2 comprises, furthermore, an upper toothing D2-3 at said second upper face 2u. The second crown 2 has a series of the teeth emerging from the second upper face 2u along its entire circumferential development and on at least part of its radial development.

Figure 8:
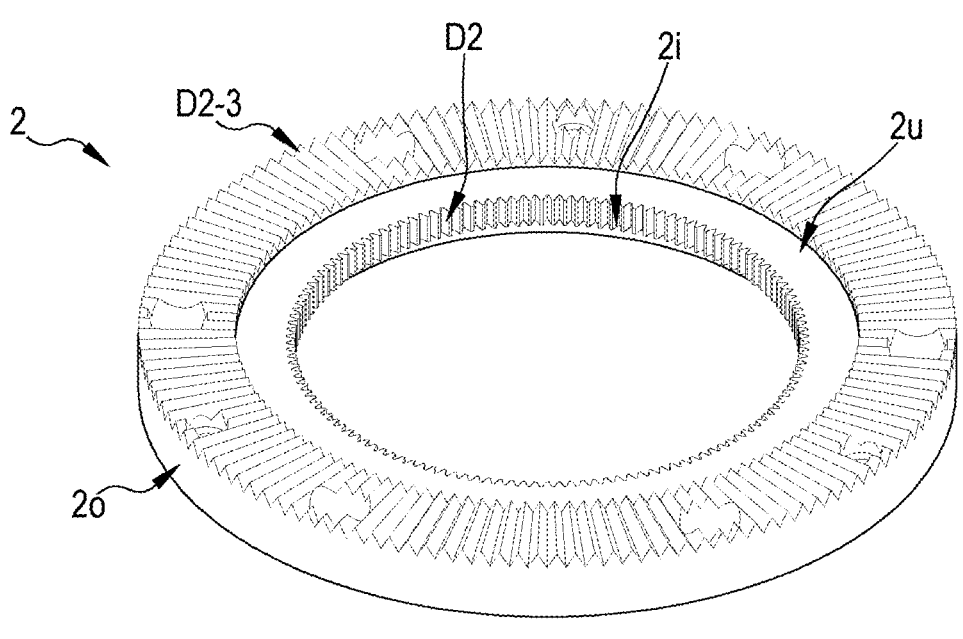
FIG. 8 is a perspective view of a second component of the device shown in FIG. 1.

In the embodiment shown in the attached figures, in particular in FIG. 8, the upper toothing D2-3 has also a number of teeth equal to N2, i.e. the same number of teeth of the second toothing D2.

Figure 9A:
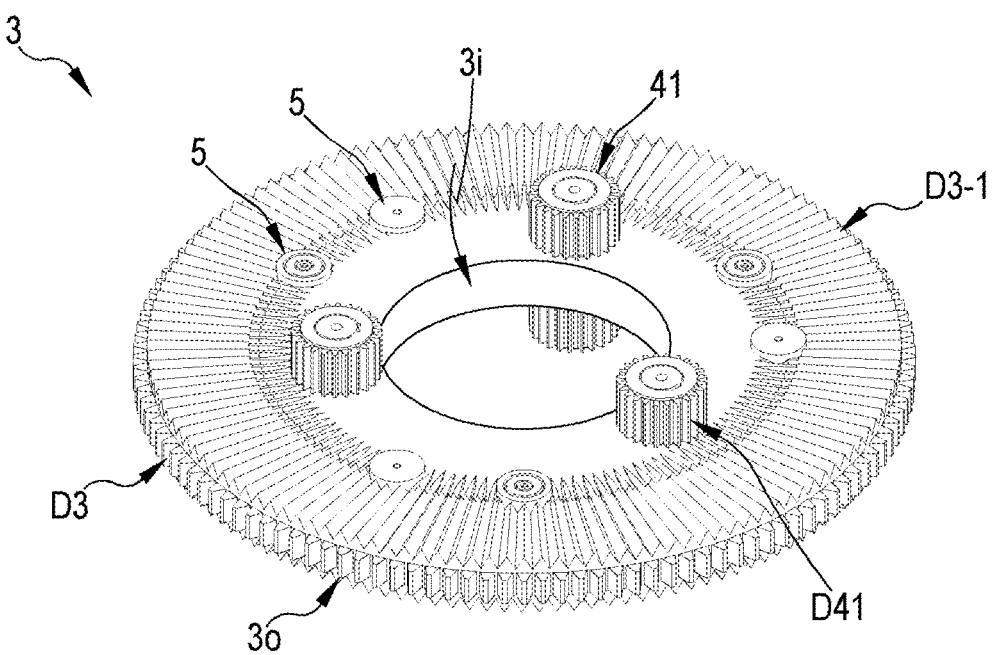
FIGS. 9A and 9B are two perspective views respectively from above and from below of a third component of the device shown in FIG. 1.
Figure 9B:
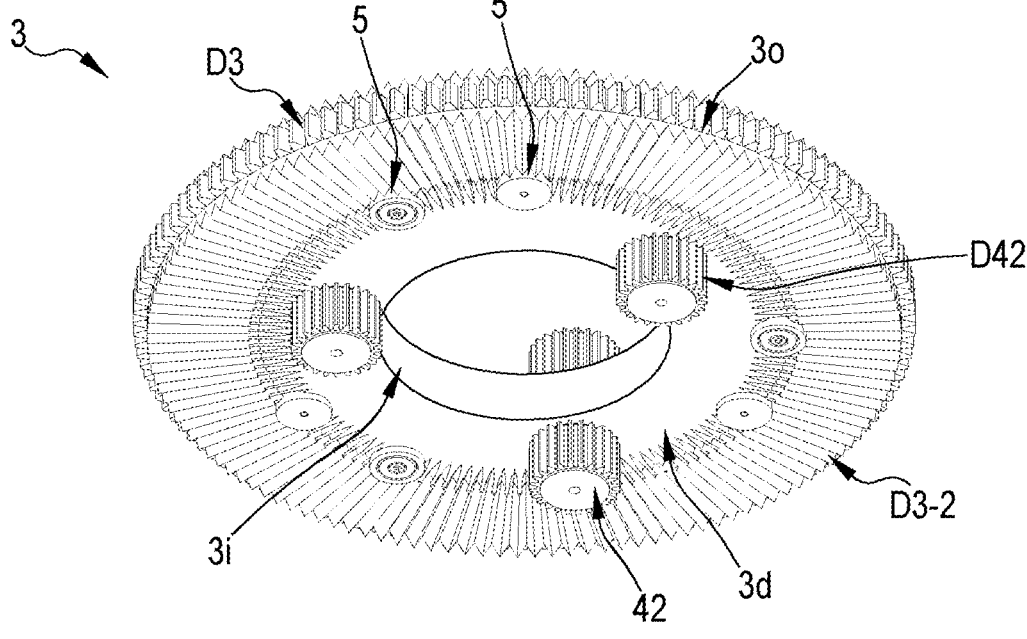

The device 100 comprises also a third crown 3. Said third crown 3 results, during use, configured for rotating around said rotation axis X. As it will become clearer later, the third crown 3 is configured for rotating relatively with respect to the first crown 1 and to the second crown 2. As shown in FIGS. 9A and 9B, the third crown 3 has:

a third external face 3*o* facing outwards;

a third internal face 3*i* facing inwards;

a third lower face 3*d* facing downwards;

a third upper face 3*u* facing upwards.

In other words, said faces represent the faces obtained by the complete rotation around the rotation axis of each of the sides of the quadrilateral the rotation thereof determines the geometry of the third crown.

In particular, the third upper face 3*u* results facing to the first lower face 1*d* of the first crown 1 and the third lower face 3*d* results facing to the second upper face 2*u* of the second crown 2.

As shown in the attached figures, the third crown 3 comprises a third toothing D3 at said third external face 3*o* or at said third internal face 3*i*. The third crown 3 has a series of the teeth emerging from the third external face 3*o* or from the third internal face 3*i* along its entire circumferential development. In the shown embodiment, the third toothing D3 is placed on the third external face 3*o*.

The third crown 3 comprises a primary coupling toothing D3-1 at said third upper face 3*u* and secondary coupling toothing D3-2 at said third lower face 3*d*. The third crown has a series of the teeth emerging from said third upper face 3*u* and third lower face 3*d* along the entire circumferential development thereof and on at least part of their radial development.

In particular, said primary coupling toothing D3-1 has a number of teeth equal to a number of teeth of the lower toothing D1-3 of the first crown 1. More specifically, said primary coupling toothing D3-1 and said lower toothing D1-3 have equal profile for allowing a coupling between the third crown 3 and the first crown 1, as it will become clearer in the following.

In substantially the same way, said secondary coupling toothing D3-2 has a number of teeth equal to a number of teeth of the upper toothing D2-3 of the second crown 2. Specifically, said secondary coupling toothing D3-2 and said upper toothing D2-3 have equal profile for allowing a coupling between the third crown 3 and the second crown 2, as it will become clearer in the following.

As previously described, in the embodiment of the attached figures, the lower toothing D1-3 has N1 teeth and the upper toothing D2-3 has N2 teeth. Consequently, said primary coupling toothing D3-1 has N1 teeth and said secondary coupling toothing D3-2 has N2 teeth.

Furthermore, in the shown embodiments in the attached figures, also the third toothing D3 has a number of teeth equal to N2.

Said number of teeth N1 and number of teeth N2 are different from each other. As it will become clearer later, the difference between the numbers of the teeth of the toothings determines a rotation of the first crown 1 in order to ensure an extremely precise positioning of the component 200 constrained to the first crown 1 itself. Specifically, N1 and N2 represent two integers that differ from each other for a determined number of the unit. Generally, between the number N1 and the number N2 there is a relation of the type N1=N2±K, with K that is an integer greater than 0.

In the embodiment shown in the attached figures, the number of teeth N1 and the number of teeth N2 differ of a unit (K=1), i.e. N1=N2±1. In particular, in the embodiment shown, N1=136 and N2=135.

As evident from the comparison between FIGS. 1-2 and 3-4, the device 100 results configurable between the following configurations:

closed configuration P1 or working configuration (FIG. 1-2), wherein said lower toothing D1-3 and said primary coupling toothing D3-1 are engaged with each other, said secondary coupling toothing D3-2 and said upper toothing D2 are too engaged with each other, and wherein said first crown 1, second crown 2 and third crown 3 are integral with each other;

open configuration P2 or positioning configuration (FIGS. 3 and 4), wherein said first crown 1, second crown 2 and third crown 3 are spaced from each other and said lower toothing D1-3, primary coupling toothing D3-1, secondary coupling toothing D3-2, said upper toothing D2-3 non are engaged with each other.

It is noted in particular that in the closed position P1 no relative movement is possible between said first crown 1, second crown 2 and third crown 3. In other words, the device 100 constitutes in fact a single block wherein the three crowns remain integrally constrained. Specifically, being the second crown 2 fixed, also the first crown 1 and the third crown 3 result fixed. Consequently, also the component 200, that is constrained to the first crown 1, results fixed. Then, when the device 100 is in said closed configuration P1, it is not possible to vary the position of the component 200 connected to the device 100.

On the contrary, when the device 100 is in the open configuration P2, is possible a relative movement between said first crown 1, second crown 2 and third crown 3. In particular, the rotation of the first crown 1 around the rotation axis X involves a variation of the position of the component 200. Bringing back the device 100 in the closed configuration P1, the position taken in the open configuration P2 can be maintained without the action of further blocking means.

The device 100 comprises furthermore at least one satellite gear 4. Said at least one satellite gear 4 results associated with said third crown 3 and is brought into rotation around said rotation axis X by the third crown. In other words, the at least one satellite gear 4 is connected and supported by said third crown 3, which puts it in rotation when it rotates around the rotation axis X.

As shown, said at least one satellite gear 4 is engaged simultaneously to said first crown 1 and to said second crown 2. According with this aspect, the at least one satellite gear 4 comprises two toothings placed at the opposite sides of the third crown 3 along the rotation axis X, of which one is coupled to the first toothing D1 and the other is coupled to the second toothing D2.

Figure 10A:
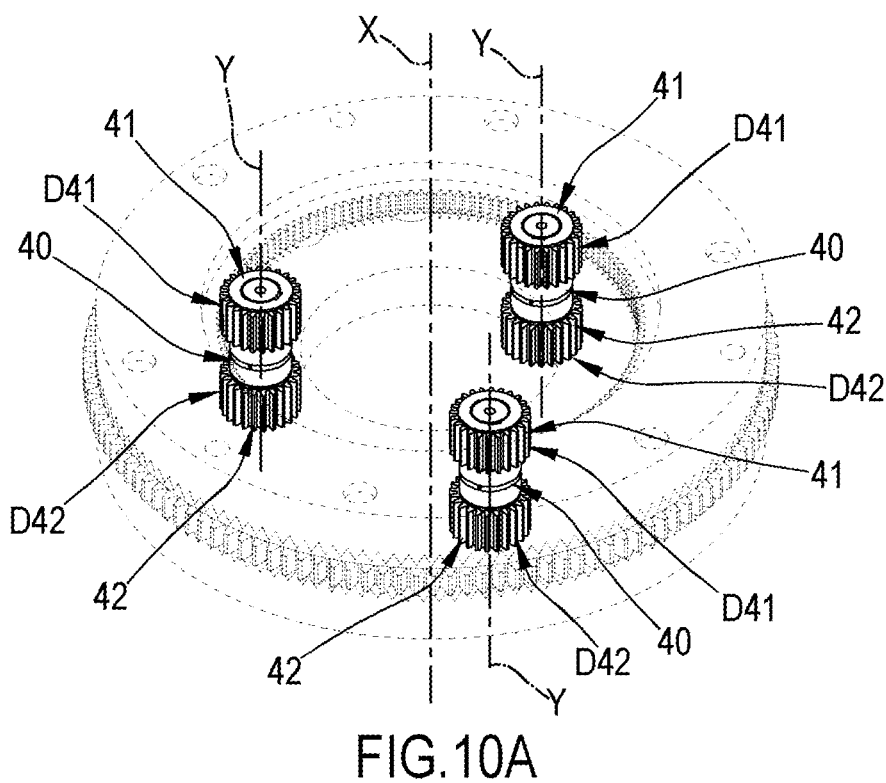
FIGS. 10A and 10B are respectively a perspective view and a plain view from below of a fourth component of the device shown in FIG. 1 with some parts dashed or hidden for clarity.
Figure 10B:
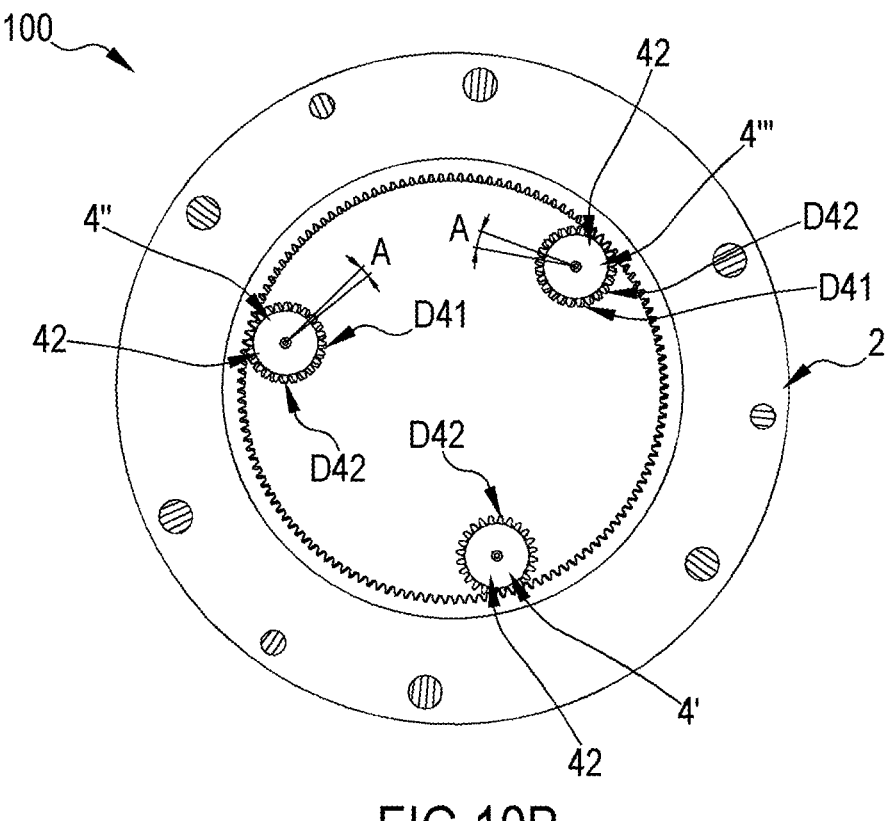

As shown in detail in FIGS. 10A and 10B, said at least one satellite gear 4 comprises a shaft 40, a first pinion 41 and a second pinion 42. Said shaft 40 develops along a longitudinal extension axis Y and crosses said third crown 3 from said third lower face 3*d* to said third upper face 3*u*, resulting projecting from them. In particular, said longitudinal extension axis Y results parallel to the rotation axis X.

The third crown 3 comprises at least a seat for said at least one satellite gear 4, specifically for allowing the housing of said shaft 40. The shaft is configured for rotating with respect to said third crown 3 around said longitudinal extension axis Y inside the relative seat, which is preferably provided with appropriate bearings.

As shown still in FIGS. 10A-10B, at least one between said first pinion 41 and second pinion 42 results fitted on said shaft 40 integrally to it and/or at least one between said first pinion 41 and second pinion 42 is realized in a single piece with said shaft 40. In the embodiment shown, the first pinion 41 results fitted on said shaft 40 integrally to it while the second pinion 42 is realized in a single piece with the shaft 40 itself.

Specifically, the assembly composed by said shaft 40, first pinion 41 and second pinion 42—coincident, in fact, with the satellite gear 4—is configured for rotating integrally around said longitudinal extension axis Y while it is brought into rotation around said rotation axis X by the third crown 3.

Figure 5:
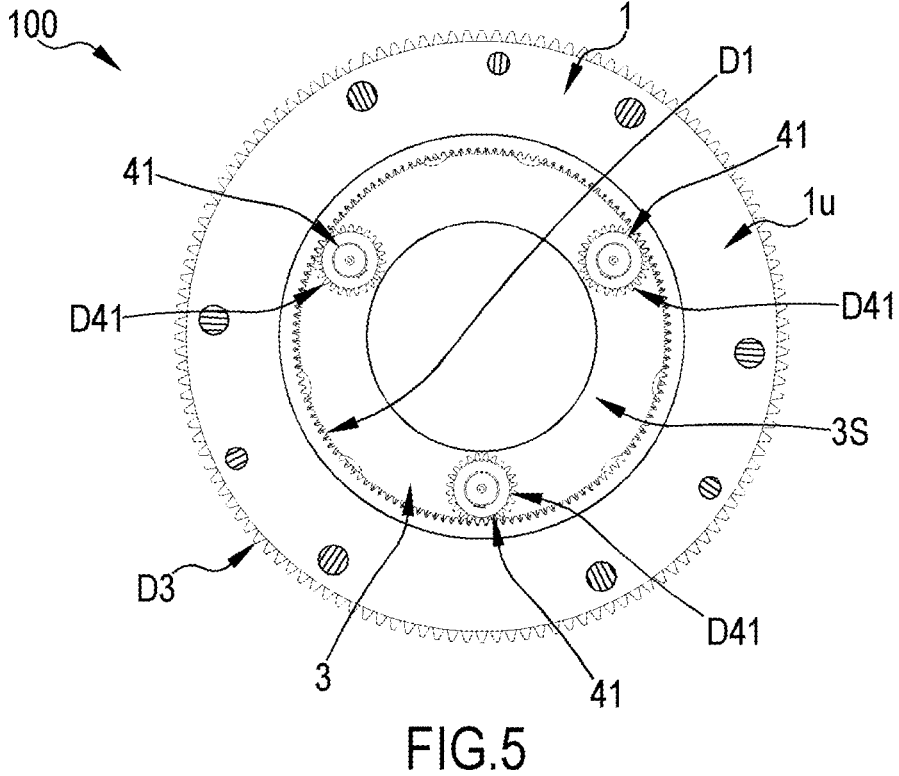
FIG. 5 is a plain view from above of the device shown in FIG. 1.
Figure 6:
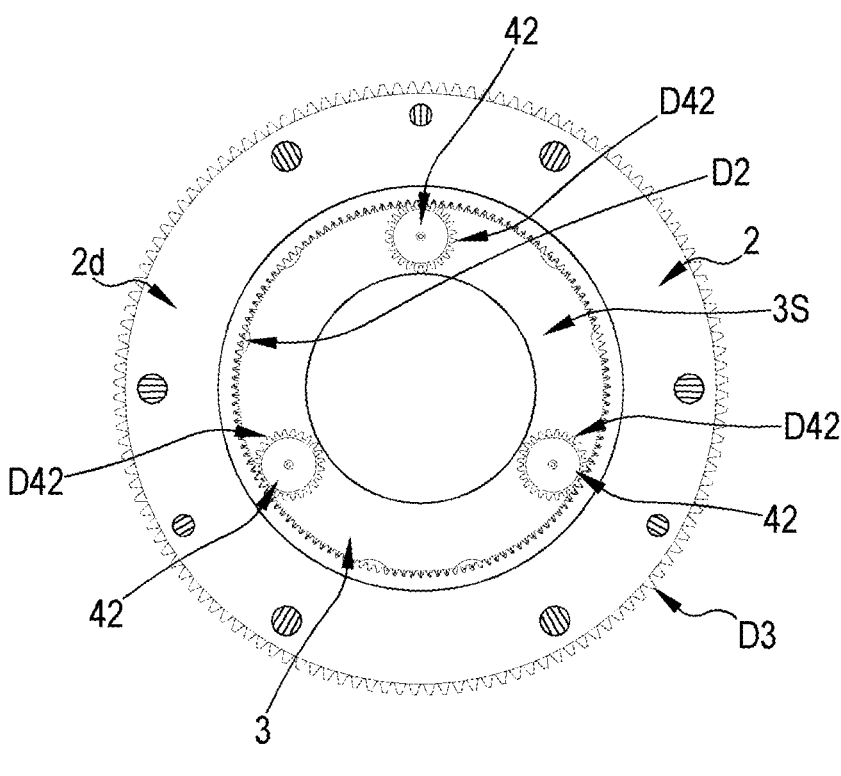
FIG. 6 is a plain view from below of the device shown in FIG. 1.

As shown in FIGS. 5, 6 and 9A-9B, said first pinion 41 and second pinion 42 are provided with relative toothing. Specifically, as shown in FIGS. 5 and 9A, the first pinion 41 is provided with a first satellite toothing D41, which results engaged to the first toothing D1 of the first crown 1. As shown, on the contrary, in FIGS. 6 and 9B, the second pinion 42 is provided with a second satellite toothing D42, which results engaged to the second toothing D2 of the second crown 2.

In the embodiment shown, said first toothing D1 is placed at said first internal face 1*i* and said second toothing D2 is placed at said second internal face 2*i*. In other words, the toothing geared by said at least one satellite gear 4 are on the faces internal of the first crown and of the second crown, i.e. the portions facing on the rotation axis X. On the contrary, said third toothing D3 is placed at said third external face 3*o*, i.e. facing outwards for being engaged by further toothed elements as it will be described hereinafter. The at least one satellite gear 4 is then positioned internally to the first crown 1 and to the second crown 2.

In another not shown embodiment, said first toothing D1 is placed at said first external face 1*o* and said second toothing D2 is placed at said second external face 2*o*. In other words, the toothing geared by said at least one satellite gear 4 are on the external faces of the first crown and of the second crown, i.e. the portions facing outwards. In this embodiment, the at least one satellite gear 4 is then positioned externally to the first crown 1 and to the second crown 2. On the contrary, said third toothing D3 is placed at said third internal face 3*i*, i.e. facing said rotation axis X for being engaged by further toothed elements.

It is noted that it is appropriate that said first toothing D1 and second toothing D2 are both on the internal faces or in the external faces of the respective crowns so as to be simultaneously engaged by the satellite gears 4. The third toothing D3 is preferably facing in the opposite direction to said first and second toothings D1 and D2. However, with appropriate measures, it can be facing in the same direction of the first toothing D1 and of the second toothing D2.

In the embodiment shown, said first satellite toothing D41 and said second satellite toothing D42 have an equal number of teeth N3. Said first satellite toothing D41 and said second satellite toothing D42 have furthermore the same pitch diameter. In fact, said first satellite toothing D41 and second satellite toothing D42 are two identical toothing and consequently said first pinion 41 and second pinion 42 are structurally identical.

Preferably, said first toothing D1 and said second toothing D2 have equal pitch diameter. In fact, the first crown 1 and the second crown 2 have the first toothing D1 and the second toothing D2 on respective internal or external faces, according to the embodiment, having substantially equal diameter.

As shown in the attached figures, the first toothing D1 and the second toothing D2 have each one teeth with involute profile with modulus correction in order to be engaged, respectively, to said first satellite toothing D41 and to said second satellite toothing D42. In fact, given the discrepancy between the numbers of the teeth N1 and N2 and the equality between the pitch diameters, without applying a modulus correction technique to the first toothing D1 and/or to the second toothing D2 it would be impossible to simultaneously correctly engage the first satellite toothing D41 and the second satellite toothing D42, that as anticipated are coincident. In this sense, the use of the modulus correction technique allows to the at least one satellite gear 4 to simultaneously correctly engage and simultaneously both the first toothing D1 and the second toothing D2 without substantial structural differences between the first satellite toothing D41 and the second satellite toothing D42.

In alternative not shown embodiments, said first satellite toothing D41 and second satellite toothing D42 are different from each other in the number of teeth and/or in the profile teeth and/or in the respective pitch diameters for allowing a correct engagement both with the first toothing D1 and with the second toothing D2, without the latter necessarily having to have the same pitch diameter and/or a modulus correction technique should be applied to ensure the correct engagement between the teeth of said first toothing D1 and second toothing D2 with the relative first satellite toothing D41 and second satellite toothing D42.

Preferably, said device 10 comprises a plurality of the satellite gears 4, i.e. at least two satellite gears 4. Specifically, each of said satellite gears 4 forms with another satellite gear adjacent thereto a determined angle with respect to the rotation axis X, i.e. said satellite gears occupy different positions along the circumferential development of the third crown 3. In the embodiment shown, the device 100 comprises three satellite gears 4 common circumference and angularly spaced equidistant and equispaced with respect to the rotation axis X. In other words, the third crown 3 has three seats placed on a common circumference and angularly spaced by 120° with respect to the rotation axis X.

As shown in FIG. 10B, at least one satellite gear 4 has the first satellite toothing D41 rotated around said longitudinal extension axis Y by an angle A with respect to the second satellite toothing D42. In fact, being the numbers of the teeth N1 and N2 different, the first toothing D1 and the second toothing D2 have most of their teeth non-aligned along the rotation axis. Specifically, the first toothing D1 and the second toothing D2 have a limited number of pairs of the aligned teeth, precisely have a number of the aligned pairs equal to absolute value of the difference N1-N2. In the embodiment shown, where N1-N2=136-135=1, the first toothing D1 and the second toothing D2 have at most a single pair of teeth aligned along the rotation axis X, according to the relative positioning thereto. If the number of the satellite gears 4 was greater than the absolute value of the difference N1-N2 and first and second satellite toothings D41, D42 were completely aligned, a correct engagement would not be possible with the teeth of the first toothing D1 and/or of the second toothing D2. In this sense, in order to ensure a correct engagement of all the satellite gears with the first toothing D1 and the second toothing D2, at least one of the satellite gears 4 has the first satellite toothing D41 rotated with respect to the second satellite toothing D42 around the longitudinal extension axis Y.

In the embodiment shown in the attached figures, N1-N2=136-135=1 and therefore the first toothing D1 and the second toothing D2 can show at most a single pair of the aligned teeth, according to the relative positioning thereto. As shown in detail in FIG. 10B, this pair of the aligned teeth can be engaged by only one of the three satellite gears 4. In order to ensure the correct engagement with both the toothing D1 and D2, the other two satellites 4 have the first satellite toothing D41 rotated with respect to the second satellite toothing D42 around the longitudinal extension axis Y. Being the three satellite gears 4 angularly spaced by 120° along a common circumference having center on the rotation axis X, a satellite gear has the first satellite toothing D41 rotated by an angle A corresponding to a third of the tooth with respect to the second satellite toothing D42 around the longitudinal extension axis Y. Analogously, the remaining satellite gear has the first satellite toothing D41 rotated by an angle A corresponding to two thirds of the tooth with respect to the second satellite toothing D42 around the longitudinal extension axis Y. With reference to the perspective of FIG. 10B, the device 100 has:

the satellite gear 4' with the first satellite toothing D41 non-rotated with respect to the second satellite toothing D42;

the satellite gear 4" with the first satellite toothing D41 rotated with respect to the second satellite toothing D42 by an angle A corresponding to a third of the tooth clockwise around the longitudinal extension axis Y;

the satellite gear 4''' with the first satellite toothing D41 rotated with respect to the second satellite toothing D42 by an angle A corresponding to two thirds of the tooth clockwise around the longitudinal extension axis Y.

In order to house the satellite gears 4, said third crown 3 has a housing portion 3S comprising at least a seat for the at least one satellite gear 4. Specifically, said housing portion 3S is configured for not being in contact with said first crown 1 and second crown 2 when said device is in said closed position P1. As shown in particular in FIGS. 5 and 6, the third crown 3 is oversized with respect to the first crown 1 and to the second crown 2. In fact, the housing portion 3S represents substantially a flange upon which are obtained the seats for the housing of the satellite gears 4. In the embodiment shown, the housing portion 3S constitutes an internal flange comprising three seats for the housing of the three satellite gears 4. As previously said, these seats are preferably provided with bearings for allowing the free rotation of the satellite gears 4 around the main development axis Y.

As shown in the attached figures, the lower toothing D1-3 and the primary coupling toothing D3-1 are Hirth toothing configured for establishing a Hirth coupling between said first crown 1 and third crown 3 when said device 100 is in the closed configuration P1. In substantially the same way, the upper toothing D2-3 and the secondary coupling toothing D3-2 are Hirth toothing configured for establishing a Hirth coupling between said second crown 2 and said third crown 3 when said device 100 is in the closed configuration P1. It is noted that toothing functionally equivalent to the Hirth toothing can be used in the context of the device 100. Advantageously, the use of the Hirth toothing ensures a particularly stable gear between the crowns when the device 100 is in the closed position P1 and consequently a particular steadiness of the component 200 positioned by the device itself.

As shown in detail in FIGS. 9A-9B, the device 100 comprises at least an opening actuator 5. This at least an opening actuator 5 results configured for causing a passage of said device 100 from the closed configuration P1 to the open configuration P2. As it will become clearer in the following of the present description, when the device 100 is not subjected to the action of further elements suitable for keeping it in the closed configuration P1, the at least an opening actuator 5 ensures a transition from the closed configuration P1 to the open configuration P2. In other words, the at least an actuator 5 causes the spacing between said first crown 1, second crown 2 and third crown 3 in order to allowing a positioning of the component 200 connected to the first crown 1 after the relative movement between said crowns 1, 2, 3 and the satellite gears 4. Preferably, said at least an opening actuator 5 is positioned on said third crown 3 and is configured for acting on said first crown 1 and second crown 2 in order to space them from the third crown 3 and allowing the passage of the device 100 to the open configuration P2.

In the embodiment shown in the attached figures, the device 100 comprises six actuators of the opening 5, three of which are configured for acting on the first crown 1 and the other three are configured for acting on the second crown 2. Specifically, each of said actuators of the opening 5 comprises a spring piston acting on the relative first/second crown. Other elements functionally analogous to spring pistons can be used as opening actuators in the context of the device 100 without resulting in substantial structural changes of the device itself.

In figures from 12 to 15 it is shown a positioning system S, object of the present invention too. This system S comprises at least the following elements:

the device 100 previously described;

a component 200 to be positioned constrained to the first crown 1 of the device 100;

a actuator module 300 operatively connected to said device 1 and configured for imparting a rotary motion to said third crown 3 of the device 100.

As previously mentioned, according to the applications, said component 200 can comprise a tool for carrying out, for example, a precision processing/handling or a sensor, for example a precision optical sensor. Specifically, the component 200 is constrained to the first crown 1 through appropriate constraining means, known in the technique and therefore not illustrated or described.

The actuator module 300 is configured for being activated when said device 100 is in the open configuration P2 in order to position the component 200 through a relative rotation between said first crown 1, second crown 2 and third crown 3. Specifically, the rotary motion imparted by the actuator module 300 to the third crown 3 transfers, through the satellite gears 4, to the first crown 1 and then to the component 200 constrained to it. The relation between the rotary motion of the third crown 3 and the rotary motion of the first crown 1 is described hereinafter.

Preferably, the system S comprises a tightening module 400 configured for being activated so as to maintain said device 100 in the closed configuration P1 and for being released for allowing a passage of the device 100 from the closed configuration P1 to the open configuration P2. Specifically, the tightening module 400 is configured, when activated, for opposing and winning the action of the at least an opening actuator 5 so as to maintain the device 100 in the closed configuration P1 and ensure the steadiness of the component 200. When said tightening module 400 is released, the action of the at least an opening actuator 5 is no longer opposed and the device 100 passes to the open configuration P2 for allowing a positioning of the component 200 through a relative rotation between said first, second and third crowns. One reached the desired positioning of the component 200, the tightening module 400 is again activated and the device 100 returns in the closed configuration P1.

As shown in the embodiment of FIGS. 13A-15, the actuator module 300 comprises a motor 301 and a transmission member 302. The transmission member 302 is operatively connected to the third crown 3 and is configured for transmitting the motion imparted by said motor 301 to said third crown 3. Specifically, the motor 301 is configured for being activated only when said device 100 is in the open configuration P2. In fact, when said device 100 is in the closed position P1, the third crown 3 is integral with the second crown 2, that is fixed and then no movement of the third crown 3 is possible. The activation of the motor 301 when the device 100 is in closed configuration P1 could expose the entire system S to the risk of the malfunction and damages.

Figure 11:
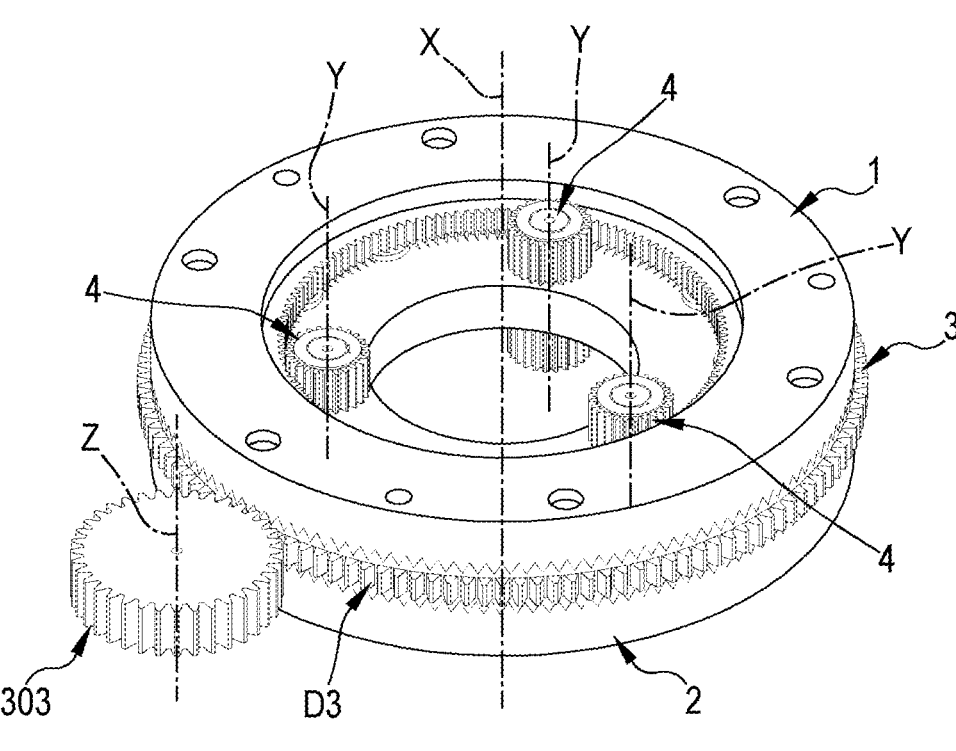
FIG. 11 is a perspective view of the device shown in FIG. 1 with another associated element.
Figure 12:
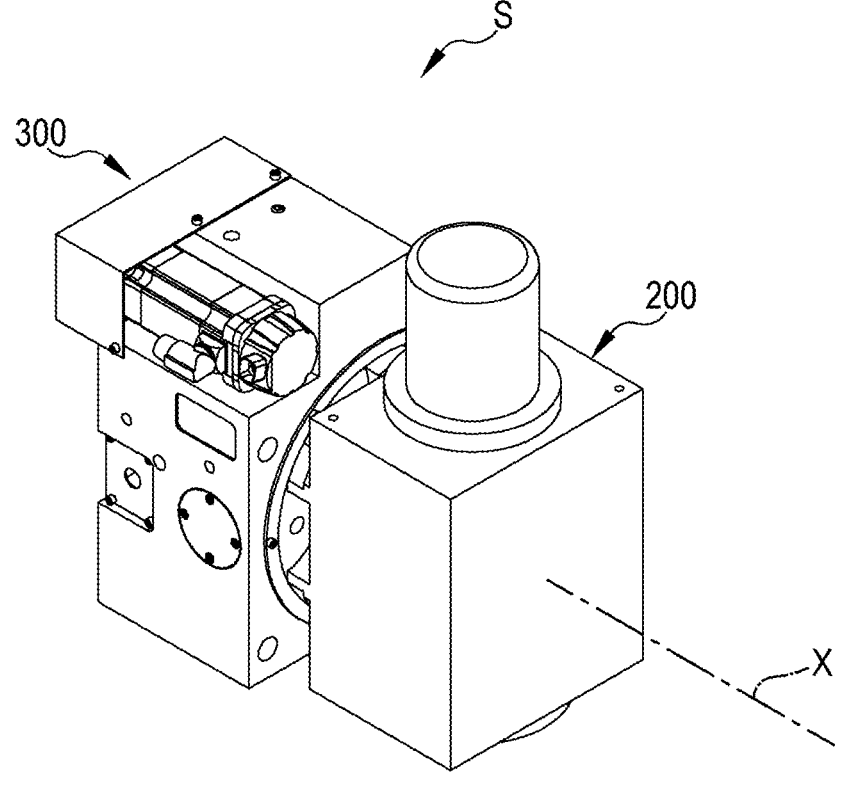
FIG. 12 shows a system comprising the device shown in FIG. 1.

Preferably, the transmission member 302 comprises at least a toothed wheel 303, shown in detail in FIG. 11. The toothed wheel 303 is configured for rotating around a transmission axis Z, preferably parallel to the rotation axis X. This toothed wheel 303 results engaged to said third toothing D3 for putting into rotation said third crown 3 around said rotation axis X as a function of the motion imparted by said motor 301.

Figure 13A:
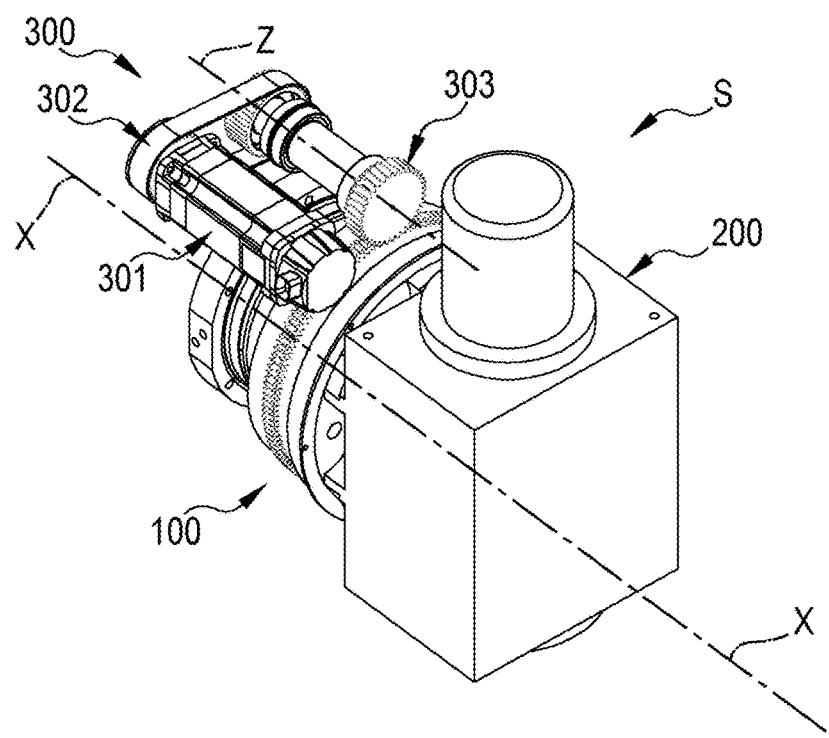
FIGS. 13A and 13B show the system of FIG. 12 in two different configurations with some parts omitted for greater clarity.
Figure 13B:
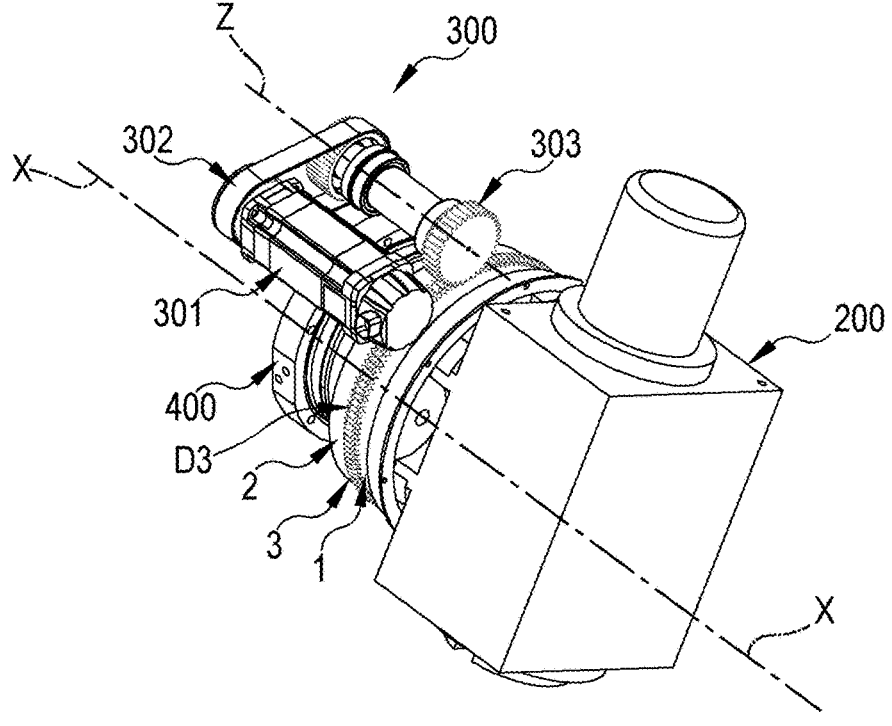
Figure 14:
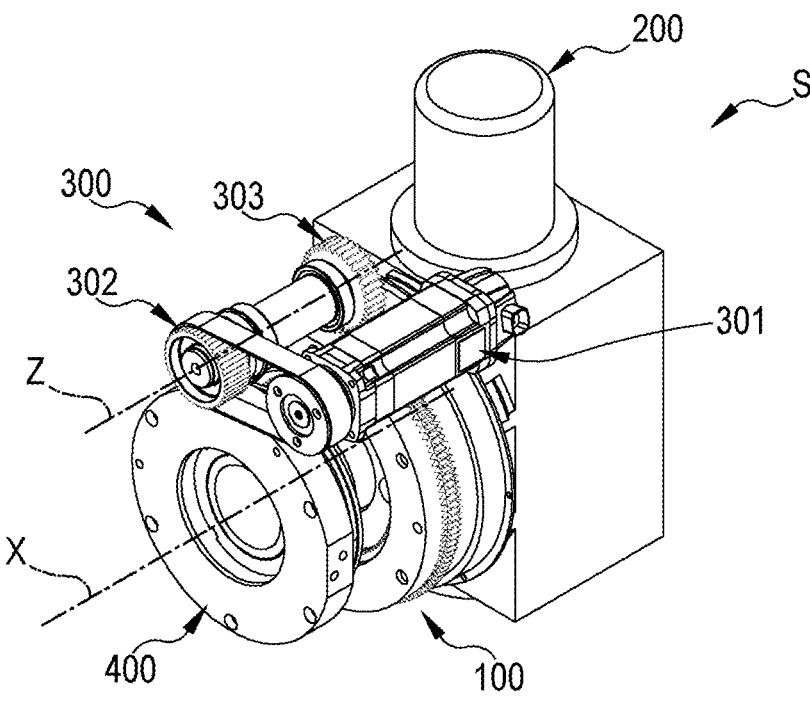
FIGS. 14 and 15 show two further perspective views of the device of FIGS. 13A-13B.
Figure 15:
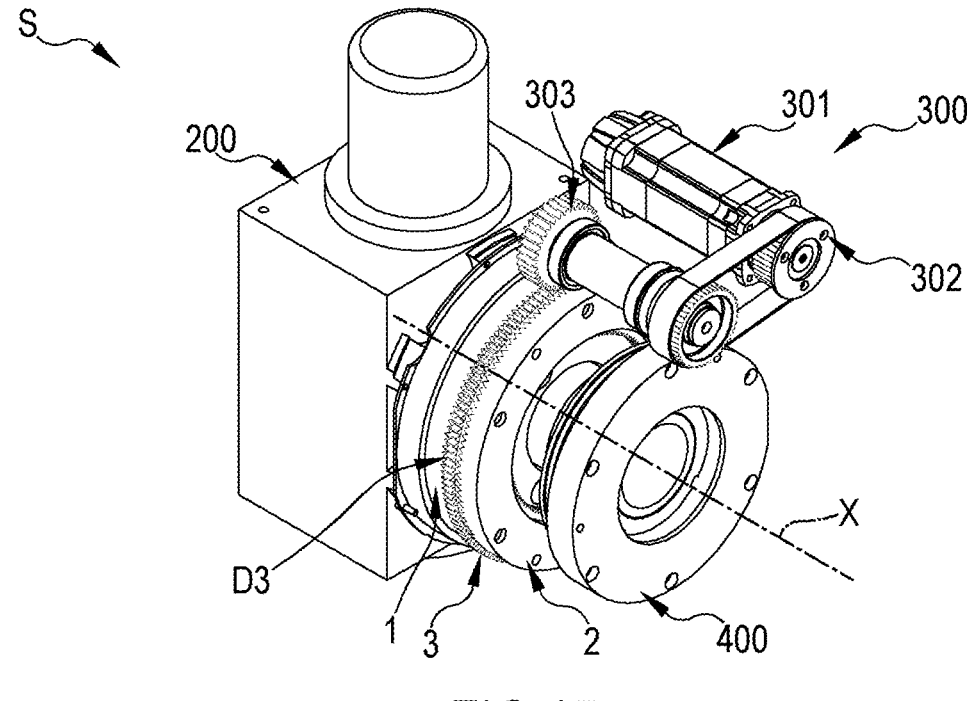

It is now described the functioning of the positioning system S by virtue of the technical characteristics of the device 100, i.e. the positioning process that involves the variation of the position of the component 200 as shown in the passage from the configuration of FIG. 13A to the configuration of FIG. 13B.

As previously determined, when the device 100 is in closed configuration P1 the first crown 1, the second crown 2 and the third crown 3 are integral with each other and the component 200 is fixed in place. The closed configuration P1 is maintained as long as the tightening module 400 is activated.

After the release of the tightening module 400, the action of the at least an opening actuator 5 is no longer opposed and the device 100 passes in the open configuration P2 wherein the first crown 1 and the second crown 2 are spaced from the third crown 3, which results free to rotate around the rotation axis X as a function of the action of the actuator module 300. Specifically, the activation of the motor 301 causes, through the transmission member 302, the rotation of the third crown 3 around the rotation axis X. More in particular, the toothed wheel 303, rotating around the transmission axis Z, gears a determined number of teeth N of the third toothing D3 causing a proportional rotation of the third crown by an angle equal to $N \cdot 360°/N2$ around the rotation axis X.

The third crown 3 brings into rotation around the rotation axis X also the at least one satellite gear 4, which gears simultaneously the first toothing D1 and second toothing D2 respectively with said first satellite toothing D41 and second satellite toothing D42. By virtue of the difference between the number N1 of the teeth of the first toothing D1 and the number N2 of the teeth of the second toothing D2 and due to the fact that said second crown 2 is fixed in rotation, the first crown 1 undergoes a rotation around the rotation axis X that is function of said difference N1–N2. In fact, when it is moved in the open configuration P2, the device 100 behaves as a planetary geared motor with offset teeth wherein the reduction ratio is function of the difference N1–N2.

By virtue of the interaction between the at least one satellite gear 4 and said first crown and second crown, the rotation of the third crown 3 by an angle equal to $N \cdot 360°/N2$ causes a rotation of the first crown 1 by an angle equal to $N \cdot 360° \cdot (N2-N1)/(N1 \cdot N2)$. Consequently, the rotating movement of the first crown 1 is partialized into a multitude of positions equal to a multiple of the number N1, at most equal to the product $N1 \cdot N2$. In fact, when for example when $N1=N2\pm1$, at each movement of a tooth on the third crown 3, the first crown 1 rotates by an angle equal to $360°/(N1 \cdot N2)$. The first crown can take then on $N1 \cdot N2$ different angular positions, a number significantly greater than the N1 positions it could take if it were individually employed inside a traditional gear.

In the shown embodiment, where $N1=136$ and $N2=135$, the rotating movement of the first crown 1 around the rotation axis X is partialized in $136 \cdot 135=18360$ different positions. Then, at each tooth of the third crown 3 engaged by the toothed wheel 303 corresponds a rotation of the third crown 3 around the rotation axis X by an angle equal to $360°/135\simeq2.66°$. Consequently also the at least one satellite gear 4 rotates by the same angle around the rotation axis X engaging simultaneously the first toothing D1 and second toothing D2 respectively with said first satellite toothing D41 and second satellite toothing D42. The second crown 2 remains fixed, while the first crown 1, due to the difference between the numbers N1 and N2, undergoes a rotation at the rotation axis X in order to maintain the correct engagement between the first toothing D1 and the first satellite toothing D41. This rotation is equal to $360°/18360\simeq0.02°$. This angle is definitely lower than the rotation of $360°/136\simeq2.65°$ with respect to the first crown 1 would undergo if it was rotated directly from a toothed crown engaging the first toothing D1.

In summary, at each rotation of the third crown 3 due to the gear with a tooth of the toothed wheel 303 corresponds a rotation of the compensation of the first crown 1. The angle spaced from the first crown 1 during said rotation of the compensation is significantly lower with respect to the angle spaced by the third crown 3 and has the purpose of maintaining a proper gear between the first toothing D1 and the first satellite toothing D41. It is furthermore noted that if the toothed wheel 303 gears by error a tooth in excess or in defect, i.e. $N\pm1$ teeth instead of N teeth, the error in the positioning of the first crown 1, and then of the component 200, would be of modest extent, even negligible for many applications. This aspect allows of the use traditional actuator modules 300, without the need of designing ad hoc actuations meeting high requirements of precision.

The structure of system S implies that the rotation of the first crown 1 involves a contextual rotation around the rotation axis X also of the component 200, which is remembered to be constrained to the first crown 1. Once reached the desired position of the component 200, as shown for example in FIG. 13B, the tightening module 400 is activated in order to bring the device 100 in the closed configuration P1, wherein the first crown 1 is constrained third crown 3 which in turn is constrained to the second crown 2 fixed. It is then not possible any rotation of the first crown 1 around the rotation axis X and the component 200 stably maintains the assumed position. This steadiness of the position allows the component 200 to carry out the workings to which it is predisposed before being moved again by releasing the tightening module 400 and by appropriately moving the crowns of the device 100.

Advantages of the Invention

The present invention involves significant technical effects with respect to the state of the art.

Firstly, the device 100 according to the present invention allows an extremely precise positioning of the component 200, which can be then used for carrying out operations wherein an extreme precision is required. In particular, the device 100 allows to partialize the rotation of the first crown 1 in a multitude of the positions with extremely fine pitch. In the specific, the device 100 allows to position the component 200 in a number of different positions that is a multiple of the number of the positions that could be ensured by a traditional gear. As previously described, the use of the device 100 allows to position the first crown 1 and the component 200 connected thereto in a multitude of different positions equal to a multiple of the number N1, at most equal to $N1 \cdot N2$ different positions when, for example, $N1=N2\pm1$.

This property makes the device 100 particularly suitable for fields of the technique wherein it is required an extreme precision in operations.

In this sense, the device 100 results particularly easy and then cost-effective to produce and durable over time. In fact, should the same result be achieved with traditional gears it would be necessary an extremely laborious and onerous manufacturing process in order to produce toothed wheels having a high number of teeth with a precise profile. In fact, only with extremely complex and precise gears would it be possible to guarantee a number of positions comparable to those allowed by the device 100. In addition to the drawbacks related to the cost of the production, such gears would undergo a rapid performance degradation due to the wear they are subjected to during the positioning operations.

Another advantage is related to the modest impact caused to the engagement of a wrong number of teeth in excess or in defect. The clicking of a tooth of the third crown 3 produces a rotation of the first crown 1 which is significantly lower than the rotation of the third crown 3. In this sense, as a result of an error in the number of teeth geared on the third crown 3, the positioning error of the first crown 1 is markedly attenuated and the component 200 is still found to be operating in a position suitable for the proper performance of the tasks to which it is assigned.

Another advantage is related to the toughness of the component 100 when it is in the closed configuration P1. The mutual engagement between the toothing of the different crowns of the device 100, in particular when these crowns have Hirth toothing, makes definitely reliable the maintenance of the position achieved in the positioning operations, i.e. when the component 100 is in the open configuration P2.

Yet another advantage of the device 100 is to make particularly easy and cost-effective the system S where it is used. In particular, the reduction ratio between the rotation of the third crown 3 and the one of the first crown 1 allows to use actuator modules 300 already commercially available, without the need of designing actuators characterized by very high precision and accuracy in the handling of the connected components.

Finally, the relative positioning process carried out using the device 100 requires a simple conversion between the desired angular displacement of the first crown 1 (and then of the component 200) and the number of teeth to gear with the actuator module 300, specifically with the toothed wheel 303. Furthermore, by virtue of the characteristics of the device 100, errors of a few units in the above mentioned conversion result in modest discrepancies in the positioning of the first crown 1 that typically allow a correct operation of the component 200.

The invention claimed is:

1. A mechanical positioning device (100) for positioning a component (200) comprising:
   a first toothed crown (1) integrally connected, during use, to said component (200), said first crown (1) being configured for rotating around a rotation axis (X) and having a substantially annular form with a first external face (1o), a first internal face (1i), a first upper face (1u), a first lower face (1d); said first crown (1) comprising a first toothing (D1) at said first internal face (1i) or at said first external face (1o); said first crown (1) also comprising a lower toothing (D1-3) at said first lower face (1d); said first toothing (D1) having a number of teeth equal to N1;
   a second toothed crown (2) fixed in rotation with respect to said rotation axis (X); said second crown (2) having a substantially annular form with a second external face (2o), a second internal face (2i), a second upper face (2u), a second lower face (2d); said second crown (2) comprising a second toothing (D2) at said second internal face (2i) or at said second external face (2o), said second crown (2) also comprising an upper toothing (D2-3) at said second upper face (2u); said second toothing (D2) having a number of teeth equal to N2;
   a third toothed crown (3) interposed between said first crown (1) and said second crown (2); said third crown (3) being configured for rotating around said rotation axis (X) and having a substantially annular form with a third external face (3o), a third internal face (3i), a third upper face (1u), a third lower face (3d); said third crown (3) comprising a third toothing (D3) at said third internal face (31) or at said third external face (3o), a primary coupling toothing (D3-1) at said third upper face (3u) and a secondary coupling toothing (D3-2) at said third lower face (3d); said primary coupling toothing (D3-1) having a number of teeth equal to a number of teeth of said lower toothing (D1-3); said secondary coupling toothing (D3-2) having a number of teeth equal to a number of teeth of said upper toothing (D2-3);
   at least one satellite gear (4) associated with said third crown (3) and brought into rotation around said rotation axis (X) by said third crown (3); said at least one satellite gear (4) being engaged with said first toothing (D1) and with said second toothing (D2);
   said number of teeth N1 and number of teeth N2 being different from each other;
   said device (100) being configurable between the following configurations:
   a closed configuration (P1), wherein said lower toothing (D1-3) and said primary coupling toothing (D3-1) are engaged with each other, said upper toothing (D2-3) and said secondary coupling toothing (D3-2) are engaged with each other, and wherein said first crown (1), second crown (2) and third crown (3) are integral with each other; and
   an open configuration (P2), wherein said first crown (1), second crown (2) and third crown (3) are spaced from each other and said lower toothing (D1-3), primary coupling toothing (D3-1), secondary coupling toothing (D3-2), said upper toothing (D2-3) are not engaged with each other.

2. The device (100) according to claim 1, wherein the number of teeth N1 and the number of teeth N2 differ by a tooth, i.e. N1=N2±1;
   or wherein the number of teeth N1 and the number of teeth N2 differ by two or more teeth, i.e. N1=N2±n, where n is an integer greater than 1;
   and/or wherein said lower toothing (D1-3) has a number of teeth equal to N1;
   and/or wherein said upper toothing (D2-3) has a number of teeth equal to N2;
   and/or wherein said third toothing (D3) has a number of teeth equal to N2.

3. The device (100) according to claim 1, said first toothing (D1) is placed at said first internal face (1i), said second toothing (D2) is placed at said second internal face (2i) and said third toothing (D3) is placed at said third external face (3o);
   or wherein said first toothing (D1) is placed at said first external face (1o), said second toothing (D2) is placed at said second external face (2o) and said third toothing (D3) is placed at said third internal face (3i).

4. The device (100) according to claim 1, wherein said at least one satellite gear (4) comprises a shaft (40), a first pinion (41) provided with a first satellite toothing (D41) and a second pinion (42) provided with a second satellite toothing (D42);

and/or wherein said first satellite toothing (D41) is engaged with said first toothing (D1) and said second satellite toothing (D42) is engaged with said second toothing (D2);

and/or wherein said shaft (40), first pinion (41) and second pinion (42) are configured for rotating with respect to said third crown (3) around a longitudinal extension axis (Y) of the shaft (40).

5. The device (100) according to claim 4, wherein said first satellite toothing (D41) and said second satellite toothing (D42) have an equal number of teeth N3;

and/or wherein said first toothing (D1) and said second toothing (D2) have equal pitch diameters;

and/or wherein said first toothing (D1) and said second toothing (D2) have teeth with an involute profile with modulus correction in order to be engaged, respectively, with said first satellite toothing (D41) and with said second satellite toothing (D42).

6. The device (100) according to claim 4, further comprising a plurality of satellite gears (4) and wherein at least one satellite gear (4) has said first satellite toothing (D41) rotated around said longitudinal extension axis (Y) by an angle (A) with respect to the second satellite toothing (D42), and/or wherein said lower toothing (D1-3) and primary coupling toothing (D3-1) are Hirth toothing configured for establishing a Hirth coupling between said first crown (1) and said third crown (3) when said device (100) is in the closed configuration (P1);

and/or wherein said upper toothing (D2-3) and secondary coupling toothing (D3-2) are Hirth toothing configured for establishing a Hirth coupling between said second crown (2) and said third crown (3) when said device (100) is in the closed configuration (P1).

7. The device (100) according to claim 1, further comprising at least one opening actuator (5) configured for causing a passage of said device (100) from the closed configuration (P1) to the open configuration (P2);

and/or wherein said at least one opening actuator (5) is positioned on said third crown (3) and is acting on said first crown (1) and second crown (2);

and/or wherein said at least one opening actuator (5) comprises a spring piston, and/or wherein said third crown (3) has a housing portion (3S) comprising at least one seat for said at least one satellite gear (4), said housing portion (3S) being configured for not being in contact with said first crown (1) and said second crown (2) when said device is in said closed configuration (P1).

8. A positioning system (S) comprising:

the device (100) according to claim 1;

the component (200) to be positioned, constrained to said first crown (1); and an actuator module (300) operatively connected to said device (100) and configured for imparting a rotary motion to said third crown (3).

9. The system(S) according to claim 8, further comprising a tightening module (400) configured to be activated so as to maintain said device (100) in the closed configuration (P1) and configured to be released so to allow a passage of the device (100) from the closed configuration (P1) to the open configuration (P2), and/or wherein said actuator module (300) comprises a motor (301) and a transmission member (302) operatively connected to said third crown (3);

and/or wherein said transmission member (302) comprises at least one toothed wheel (303) engaged with said third toothing (D3) in order to rotate said third crown (3).

10. The system(S) according to claim 8, wherein said component (200) is a tool head adapted to complete a processing and/or a manipulation of an object.

11. A positioning process for positioning the component (200) comprising the following steps:

arranging the device (100) according to claim 1;

constraining the component (200) to said first crown (1);

bringing said device (100) into said open position (P1);

rotating said third crown (3), causing a rotation of the first crown (1); and bringing said device (100) into said closed position (P2).

12. The positioning process according to claim 11, wherein said step of rotating said third crown (3) provides for rotating said third crown (3) by engaging a number N of teeth, causing a rotation thereof by an angle equal to $N \cdot 360°/N2$ around said rotation axis (X);

said rotation of the third crown (3) causing a rotation of the first crown (1) by an angle equal to $N \cdot 360° \cdot (N2 - N1)/(N1 \cdot N2)$ around said rotation axis (X).

* * * * *